US010134415B1

(12) United States Patent
Rangarajan et al.

(10) Patent No.: US 10,134,415 B1
(45) Date of Patent: Nov. 20, 2018

(54) SYSTEMS AND METHODS FOR REMOVING VEHICLE GEOMETRY NOISE IN HANDS-FREE AUDIO

(71) Applicant: Ford Global Technologies, LLC, Dearborn, MI (US)

(72) Inventors: Ranjani Rangarajan, Farmington Hills, MI (US); Leah Busch, Berkley, MI (US); Joshua Wheeler, Trenton, MI (US); Scott Andrew Amman, Milford, MI (US); John Edward Huber, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/786,749

(22) Filed: Oct. 18, 2017

(51) Int. Cl.
*H04R 3/00* (2006.01)
*B60N 2/02* (2006.01)
*G10L 15/00* (2013.01)
*G10L 21/0264* (2013.01)
*G10L 21/0216* (2013.01)

(52) U.S. Cl.
CPC *G10L 21/0264* (2013.01); *G10L 2021/02166* (2013.01); *H04R 2499/13* (2013.01)

(58) Field of Classification Search
CPC ........ H04R 2499/13; H04R 3/00; H04R 5/00; H04R 5/02; G10L 15/22; G10L 2015/223; G10L 21/0208; G10L 21/0264; G10L 2021/02166; G10L 25/78; B06N 2/02; B06N 2/0232; G10K 2210/128; G10K 2210/1282; G06F 3/165; G06F 3/167; H04S 7/302
See application file for complete search history.

(56) References Cited

U.S. PATENT DOCUMENTS

| | | | | |
|---|---|---|---|---|
| 7,634,095 | B2 | 12/2009 | Arun | |
| 9,343,057 | B1 | 5/2016 | Shahmurad et al. | |
| 2004/0142672 | A1 | 7/2004 | Stankewitz | |
| 2006/0023890 | A1* | 2/2006 | Kaminuma ............. | H04S 3/008 381/18 |
| 2008/0071547 | A1* | 3/2008 | Prieto .................... | B60N 2/002 704/275 |
| 2008/0273714 | A1* | 11/2008 | Hartung ................... | H04R 5/02 381/86 |
| 2008/0285775 | A1* | 11/2008 | Christoph ................ | H03G 3/32 381/99 |

(Continued)

FOREIGN PATENT DOCUMENTS

| | | | |
|---|---|---|---|
| DE | 102013011761 | A1 | 3/2014 |
| EP | 1885154 | B1 | 7/2013 |
| KR | 20140052661 | A | 5/2014 |

*Primary Examiner* — Thang Tran

(74) *Attorney, Agent, or Firm* — James P. Muraff; Neal, Gerber & Eisenberg LLP

(57) ABSTRACT

Method and apparatus are disclosed for determining and accounting for distortions to an audio signal due to the geometric properties of the interior cabin of a vehicle. An example vehicle includes a microphone, a seat having a plurality of seat positions, and a processor. The processor is configured to determine a first seat position corresponding to a point in time at which an audio signal is received, determine a cabin impulse response corresponding to the first seat position, and determine a filtered audio signal based on the cabin impulse response and the audio signal.

18 Claims, 4 Drawing Sheets

(56) References Cited

U.S. PATENT DOCUMENTS

| | | | | |
|---|---|---|---|---|
| 2014/0112490 | A1* | 4/2014 | Caillet | G10K 11/1784 381/71.4 |
| 2015/0149164 | A1* | 5/2015 | Oh | H04R 3/005 704/231 |
| 2015/0380011 | A1* | 12/2015 | Tsujikawa | B60R 11/0247 381/86 |
| 2016/0019904 | A1* | 1/2016 | Charette | G10L 25/60 704/227 |
| 2016/0039356 | A1 | 2/2016 | Talwar et al. | |
| 2016/0379631 | A1* | 12/2016 | Wang | B60N 2/0232 704/275 |

* cited by examiner

SYSTEMS AND METHODS FOR REMOVING VEHICLE GEOMETRY NOISE IN HANDS-FREE AUDIO

TECHNICAL FIELD

The present disclosure generally relates to hands-free audio in a vehicle and, more specifically, systems and method for removing noise caused by vehicle geometry in a vehicle hands-free audio system.

BACKGROUND

Many modern vehicles may include automatic speech recognition (ASR) technology for use with hands free calling. The ASR technology often includes a microphone positioned in an interior of the vehicle to pick up the speaker's voice. Data from the microphone is processed in order to pick out the words and commands spoken by the driver. Appropriate action is then taken.

The position of the microphone, while helpful for picking up the driver's voice, can include noise from various sources including the vehicle speakers, HVAC system, or open windows. Further, the vehicle geometry may affect the audio received by the microphone. These noise sources can cause the ASR to be unsuccessful, resulting in a poor user experience.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems, apparatuses, and methods for removing audio distortions caused by the vehicle geometry between a speaker's mouth and the microphone used for receiving the audio signal from the speaker. An example disclosed vehicle includes a microphone, a seat having a plurality of seat positions, and a processor. The processor is configured to determine a first seat position corresponding to a point in time at which an audio signal is received. The processor is also configured to determine a cabin impulse response corresponding to the first seat position. And the processor is further configured to determine a filtered audio signal based on the cabin impulse response and the audio signal.

An example disclosed method includes receiving, by a vehicle microphone, an audio signal. The method also includes determining, by a vehicle processor, a first seat position of a seat of the vehicle corresponding to a point in time at which the audio signal is received. The method further includes determining, by the vehicle processor, a cabin impulse response corresponding to the first seat position. And the method yet further includes determining, by the vehicle processor, a filtered audio signal based on the cabin impulse response and the audio signal.

A third example may include means for receiving an audio signal. The third example also includes means for determining a first seat position of a seat of a vehicle corresponding to a point in time at which the audio signal is received. The third example further includes means for determining a cabin impulse response corresponding to the first seat position. And the third example yet further includes means for determining a filtered audio signal based on the cabin impulse response and the audio signal.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
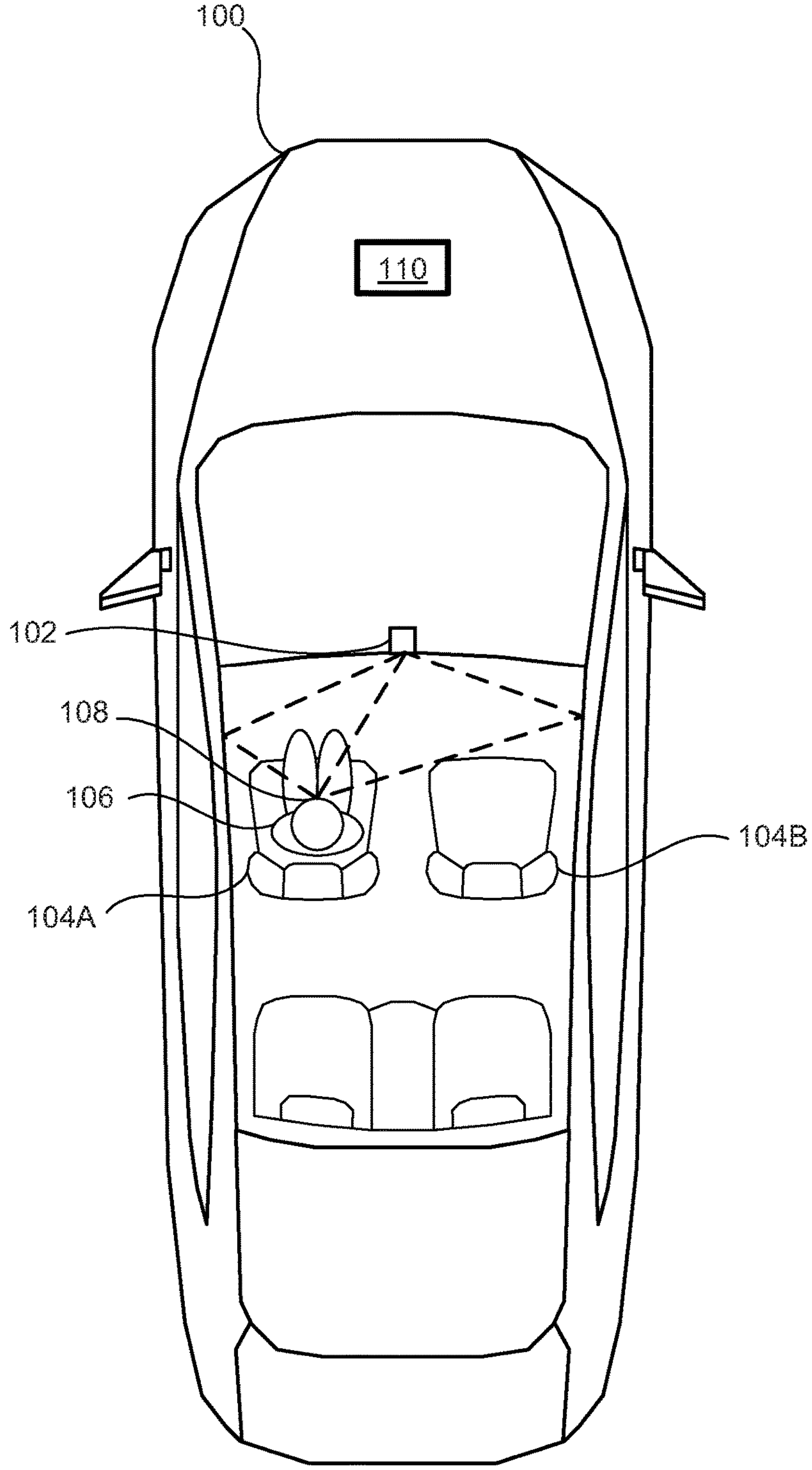
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, vehicles may include ASR or other audio technology for use by a driver or passenger, such that the driver or passenger may operate "hands-free." To begin, the driver or passenger may push a button to initiate the audio system, which may include the microphone picking up voice and other noise signals. A processor may analyze the signals received by the microphone to recognize or determine whether any words were spoken that should be acted upon, or to transmit to a recipient on the other end of a hands-free call. The processing step may often require a threshold level of signal to noise, such that words can be extracted. But in many cases, there are noise sources which may interfere with the ability of the ASR system to recognize words spoken by the driver.

Noise sources can cause the audio system to fail, or to require significant processing power to remove the noise and determine a close talk clean speech signal. In many vehicles, the microphone is placed a distance away from the mouth of the speaker, meaning that the speaker's speech may become distorted or noisy due to (1) background noise and (2) vehicle geometry. Background noise can come from any number of sources, including wind, the engine, music or other audio coming through the speakers, and many other sources. The vehicle geometry can cause distortions to speech from a speaker due to reflections and reverberations off windows or other parts of the vehicle.

With these issues in mind, example embodiments of the present disclosure may exploit known characteristics of the vehicle in order to remove or reduce distortions in the audio signal caused by the vehicle geometry.

A typical audio signal received by a vehicle microphone may include three components: (1) a close talk clean speech utterance, (2) a cabin impulse response (CIR), and (3) background noise. The close talk clean speech utterances may include audio signals of the speech coming out of the person's mouth in a quiet recording environment. As such, they may not include any background noise, distortions, or other errors, but may instead reflect a clear representation of the speech coming from a person's mouth.

The CIR may refer to a transfer function between the speaker's mouth and the microphone. The transfer function may account for the cabin acoustics of the vehicle, and the distance between the speaker's mouth and the microphone. As such, there may be a different CIR for each position of the speaker's mouth with respect to the microphone, because each location of the speaker's mouth will result in a different transfer function. Embodiments disclosed herein may include a discretized environment, where one or more CIRs are determined for each vehicle seat position.

Background noise may come from many sources inside and outside the vehicle cabin, and may be added to the close talk clean speech utterances and CIR to result in the audio signal received by the microphone. Example embodiments disclosed herein may assist in removing the CIR from the audio signal received by the microphone, in order to provide a resulting filtered audio signal that includes the close talk clean speech utterances and background noise, but does not include the distortions due to the vehicle geometry. A further filtering may be performed to remove the background noise.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components (described below with respect to FIG. 3).

As shown in FIG. 1, vehicle 100 may include a microphone 102, a plurality of seats 104A and 104B, and a processor 110. The microphone 102 may be used in some examples for ASR purposes, wherein audio is received, processed, and one or more commands or control words are determined. The processor may then take one or more actions based on the determined commands (e.g., initiating a call, modifying one or more vehicle settings, etc). The microphone may also be used in a non-ASR context, such as during a phone call when audio is received by the microphone and transmitted to a recipient.

In some examples, microphone 102 may be a single microphone, or may include a plurality of microphones. Where microphone 102 includes a plurality of microphones, microphone 102 may be an array located in a single location or distributed throughout vehicle 100. Further, microphone 102 may be located in an overhead portion of the vehicle (i.e., near a driver's head), or may be located in an overhead console, rear-view mirror, door, frame, front console, or other area of vehicle 100. Further, vehicle 100 may include a plurality of microphones, each corresponding to a particular seat or group of seats. By receiving audio at two or more microphones, the source of an audio signal can be determined.

Vehicle 100 also shows seats 104A and 104B. Each seat may have a plurality of seat positions, which may be defined as a combination of a horizontal position, a vertical position, and a back support position.

Figure 2:
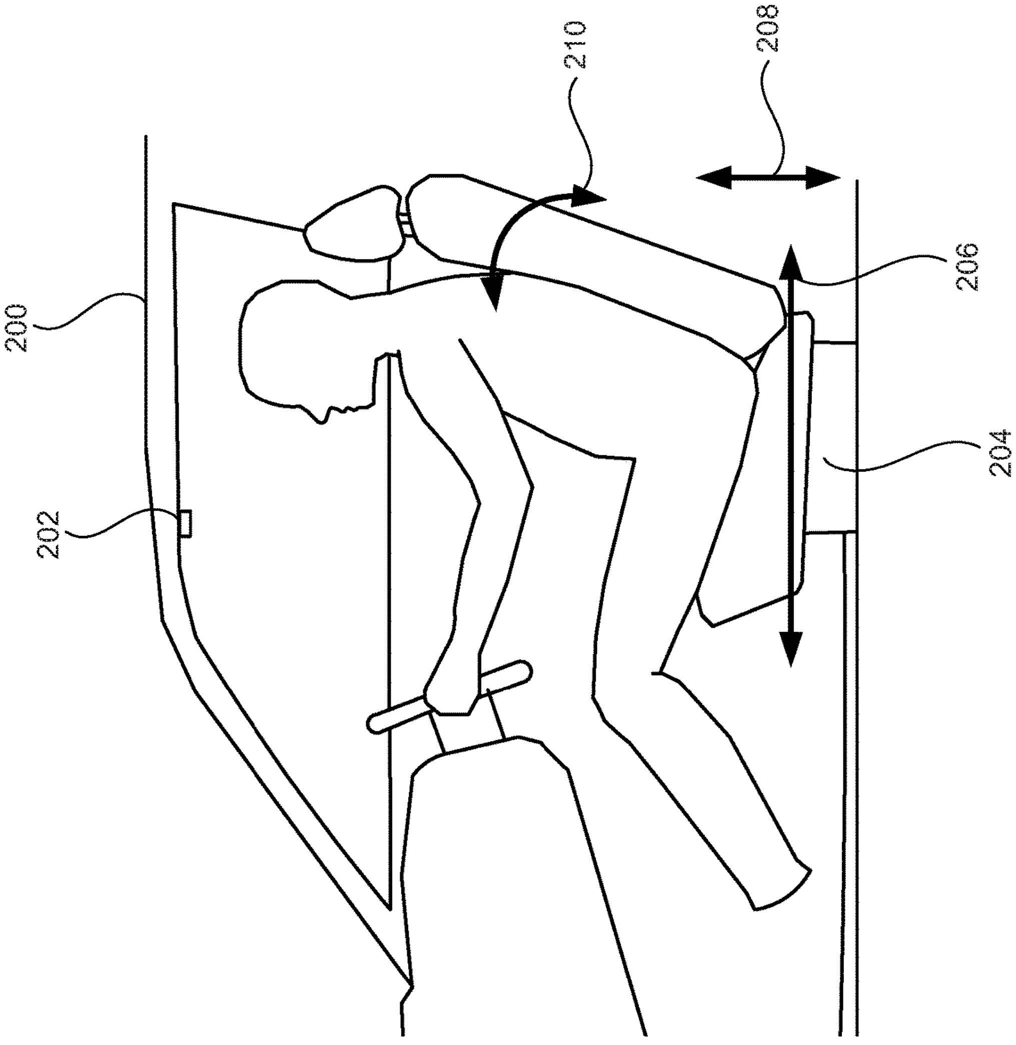
FIG. 2 illustrates an example vehicle seat according to embodiments of the present disclosure.

FIG. 2 illustrates a seat 204 in an example vehicle 200, which also includes a microphone 202. Vehicle 200 may be similar or identical to vehicle 100 in one or more respects. As can be seen in FIG. 2, seat 204 may include a horizontal position corresponding to a location along axis 206, a vertical position corresponding to a location along axis 208, and a rotational position of the back support along rotational axis 210. The horizontal, vertical, and back support positions may be detected or determined by one or more vehicle sensors. For instance, one or more potentiometers, optical encoders, or other types of sensors may be used to determine the position of the seat with respect to the horizontal, vertical, and back support position. In some example, processor 110 may determine the horizontal, vertical, and/or rotational position of the seat 204 via a vehicle data bus. This information may be used to determine the seat position as a whole.

Vehicle 100 may also include a processor 110 configured to carry out one or more functions, actions, or methods described herein. Processor 110 may be configured to receive the audio signal captured by the microphone 102. In some examples, the received audio signal may initiate or prompt the processor to carry out one or more actions. For instance, responsive to receiving the audio signal, the processor may determine one or more vehicle seat positions. Processor 110 may also receive other input configured to initiate or prompt processor actions. This may include input from a user via a user interface, or via one or more wired or wirelessly connected devices.

Processor 110 may be configured to determine a point in time at which an audio signal is received by the microphone. The processor may also determine a location of the received audio signal (i.e., which seat corresponds to the received audio signal).

In some examples, processor 110 may then determine a seat position corresponding to the point in time at which the audio signal was received. The seat position may be a first seat position corresponding to the driver's seat only (i.e., seat 104A) or the passenger seat (i.e., seat 104B). In some examples, the processor 110 may be configured to determine a seat position of the seat corresponding to the determined location of the received audio signal (i.e., the seat corresponding to the location from which the audio signal originated).

In some examples, the processor may be configured to determine a seat position that includes the position of two or more seats. For instance, the "seat position" may refer to a collective position of both seats 104A and 104B, as well as one or more other seats. And as noted above, the seat position of one or more seats may be determined by one or more vehicle sensors positioned throughout vehicle 100.

In some examples, processor 110 may be further configured to receive an occupant height corresponding to one or more seats. The occupant height may be input by the occupant via a user interface of the vehicle or a connected device, and may be used to determine a vertical position of the occupant's mouth with respect to the seat. This may provide the processor additional information that can be used to select or determine an appropriate CIR. As such, the occupant height may be a factor or component of the seat position, such that a given seat position may include a horizontal position, vertical position, back support position, and occupant height.

Once the seat position is determined by the processor 110, a corresponding CIR may be determined, based on the determined seat position. The determined CIR may correspond to first seat position corresponding to a first seat 104A, a second seat position corresponding to a second seat 104B, or a combination of the first and second seat positions, for example.

Determining the CIR may include selecting a CIR from a stored list, array, or other data structure that includes a plurality of CIRs. The plurality of CIRs may correspond respectively to each seat position or combination of seat positions. As such, there may be a CIR corresponding to each combination of possible horizontal positions, vertical positions, back support positions, and/or occupant heights. Other factors may be included as well.

In some examples, the plurality of CIRs may be determined in a laboratory setting or may be determined or generated at a manufacturing facility of the vehicle. As such, the plurality of CIRs may be predetermined and stored by the vehicle in a vehicle memory. Further, the plurality of CIRs may be specific to a given vehicle, and may be different across vehicles of different makes and models for the same determined seat position, or even vehicles having the same make and model.

As noted above, the CIR may be a transfer function between a position proximate a head of an occupant of the seat and the microphone. FIG. 1 illustrates a position 108 proximate the head of the occupant 106. As such, the CIR may be a representation of the geometry of the vehicle cabin, and may correspond to distortions that affect an audio signal during its travel from the speaker's mouth at position 108 to the microphone 102 based on the geometry of the interior of the vehicle.

Once the processor 110 determines the CIR corresponding to the seat position at the time the audio signal is received, the processor may be configured to determine a filtered audio signal based on the CIR and the received audio signal. This may include performing a deconvolution operation on the received audio signal using the determined CIR, in order to remove the effects and/or distortions caused by the vehicle cabin interior acoustics and geometry. Further filtering may be performed to remove artifacts caused by the de-convolution process and/or background noise.

In some examples, the filtered audio signal may then be processed by a speech recognition system, hands-free phone system, or other vehicle audio system.

Figure 3:
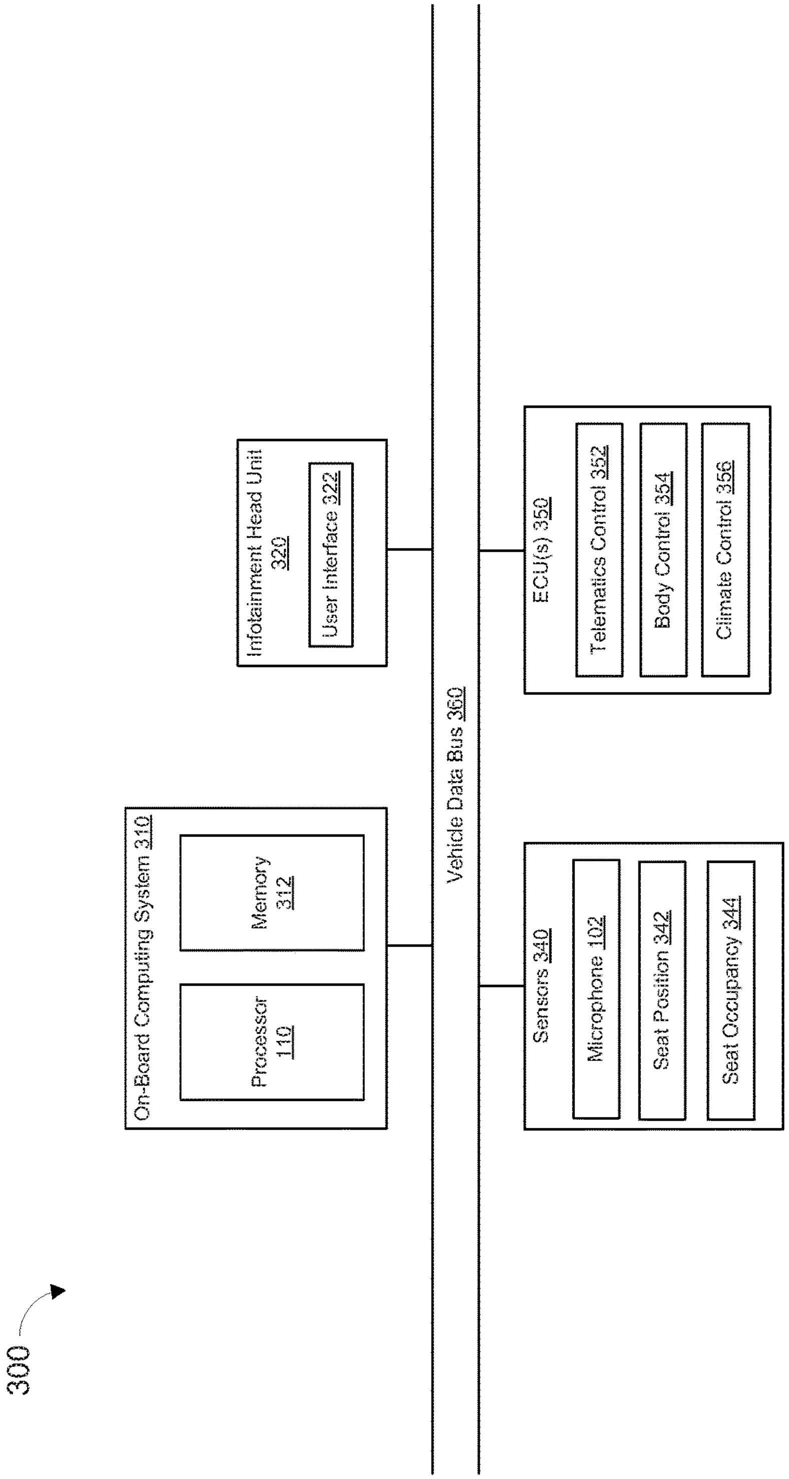
FIG. 3 illustrates an example block diagram of electronic components of the vehicles of FIGS. 1 and 2.

FIG. 3 illustrates an example block diagram 300 showing electronic components of vehicle 100 and/or 200, according to some embodiments. In the illustrated example, the electronic components 300 include the on-board computing system 310, infotainment head unit 320, sensors 340, electronic control unit(s) 350, and vehicle data bus 360.

The on-board computing system 310 may include a microcontroller unit, controller or processor 110 and memory 312. Processor 110 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 110 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 320 may provide an interface between vehicle 100 and/or 200 and a user. The infotainment head unit 320 may include one or more input and/or output devices in the form of a user interface 322 having one or more input devices and output devices. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 320 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 320 may share a processor with on-board computing system 310. Additionally, the infotainment head unit 320 may display the infotainment system on, for example, a center console display of vehicle 100 and/or 200.

Sensors 340 may be arranged in and around the vehicle 100 and/or 200 in any suitable fashion. In the illustrated example, sensors 340 include microphone 102, seat position sensor(s) 342, and seat occupancy sensor(s) 344. Microphone 102 may be electrically coupled to on-board computing system 310, such that on-board computing system 310 may receive/transmit signals with microphone 102. Seat position sensor(s) 342 may be configured to determine one or more characteristics of the various seats of the vehicle. For instance, seat position sensors 342 may determine the vertical, horizontal, and back support rotational positions of the vehicle seats. Seat occupancy sensor(S) 344 may be configured to determine whether a person is present in one or more vehicle seats. This information may be used by processor 110 to make one or more determinations or carry out one or more actions such as those described herein. Other sensors may be included as well, such as noise detection sensors, air flow sensors, and more.

The ECUs 350 may monitor and control subsystems of vehicle 100 and/or 200. ECUs 350 may communicate and exchange information via vehicle data bus 360. Additionally, ECUs 350 may communicate properties (such as, status of the ECU 350, sensor readings, control state, error and diagnostic codes, etc.) to and/or receive requests from other ECUs 350. Some vehicles may have seventy or more ECUs 350 located in various locations around the vehicle communicatively coupled by vehicle data bus 360. ECUs 350 may be discrete sets of electronics that include their own circuit(s) (such as integrated circuits, microprocessors, memory, storage, etc.) and firmware, sensors, actuators, and/or mounting hardware. In the illustrated example, ECUs 350 may include the telematics control unit 352, the body control unit 354, and the climate control unit 356.

The telematics control unit 352 may control tracking of the vehicle, for example, using data received by a GPS receiver, communication module, and/or one or more sensors. The body control unit 354 may control various subsystems of the vehicle. For example, the body control unit 354 may control power a trunk latch, windows, power locks, power moon roof control, an immobilizer system, and/or power mirrors, etc. The climate control unit 356 may control the speed, temperature, and volume of air coming out of one or more vents. The climate control unit 356 may also detect a blower speed (and other signals) and transmit to the on-board computing system 310 via data bus 360. Other ECUs are possible as well.

Vehicle data bus 360 may include one or more data buses that communicatively couple the on-board computing system 310, infotainment head unit 320, sensors 340, ECUs 350, and other devices or systems connected to the vehicle data bus 360. In some examples, vehicle data bus 360 may be implemented in accordance with the controller area network (CAN) bus protocol as defined by International Standards Organization (ISO) 11898-1. Alternatively, in some examples, vehicle data bus 360 may be a Media Oriented Systems Transport (MOST) bus, or a CAN flexible data (CAN-FD) bus (ISO 11898-7).

Figure 4:
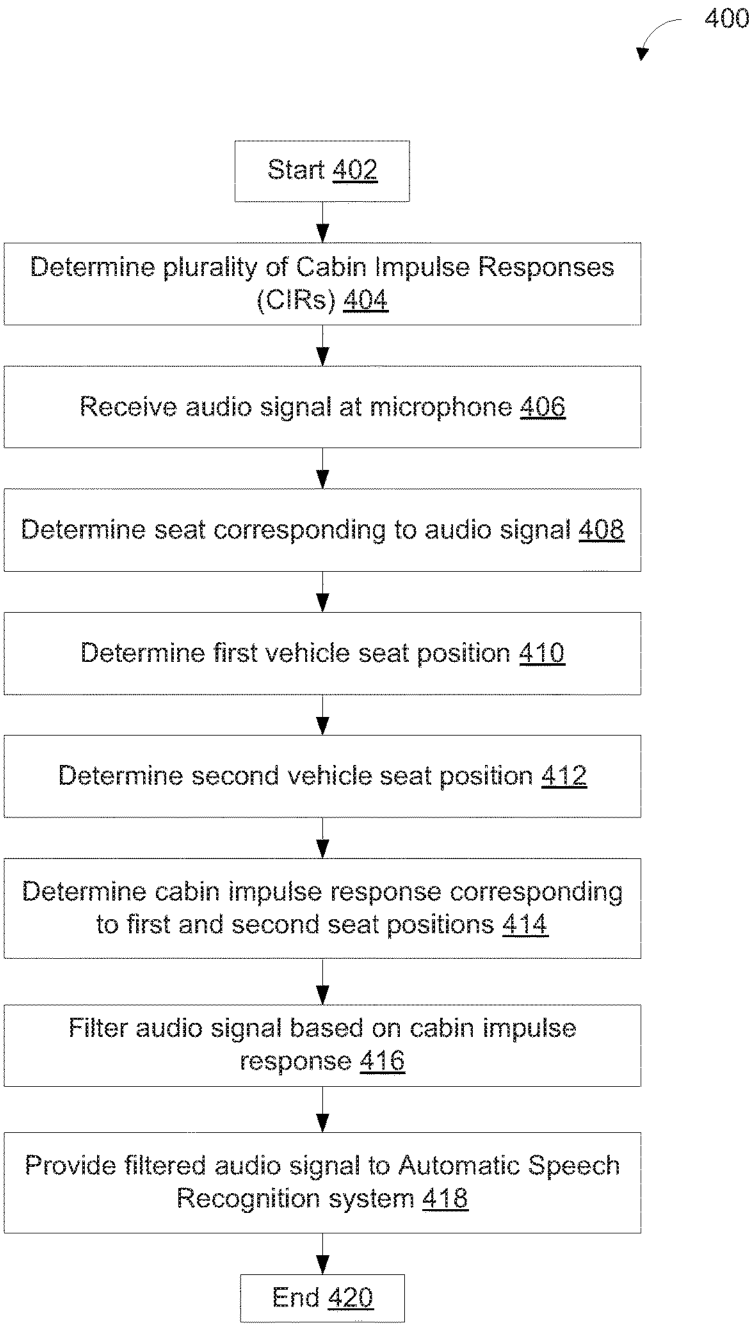
FIG. 4 illustrates a flowchart of an example method according to embodiments of the present disclosure.

FIG. 4 illustrates a flowchart of an example method 400 according to embodiments of the present disclosure. Method 400 may enable an vehicle to determine an account for distortions to an audio signal due to the geometric properties of the interior cabin of a vehicle. The flowchart of FIG. 4 is representative of machine readable instructions that are stored in memory (such as memory 312) and may include one or more programs which, when executed by a processor (such as processor 110) may cause vehicle 100, 200 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include determining a plurality of cabin impulse responses (CIRs). As described above, this can include determining a cabin impulse response corresponding to each of a plurality of vehicle seat positions, occupant heights, and more. Further, the plurality of CIRs may be determined in a laboratory setting, or at a manufacturing facility of the vehicle.

At block 406, method 400 may include receiving an audio signal at a microphone of the vehicle. The audio signal may be speech from an occupant of the vehicle. At block 408, method 400 may include determining a seat corresponding to the audio signal. In some examples, this may include analyzing data received at two or more microphones to localize the source of the audio signal. Other techniques for determining the location of the audio source may be used as well.

At block 410, method 400 may include determining a first vehicle seat position. This may include determining the vertical, horizontal, and/or back support position of a first seat of the vehicle. Further, this may include determining whether the first seat is occupied, and an occupant height corresponding to the first seat.

At block 412, method 400 may include determining a second vehicle seat position. This may be done in a manner similar or identical to the first seat position.

At block 414, method 400 may include determining a CIR corresponding to the first and second seat positions. This may include selecting a CIR from a list, array, or other data structure that includes a plurality of CIRs.

At block 416, method 400 may include filtering the received audio signal based on the determined CIR. In some examples, this may include performing a de-convolution operation on the received audio signal based on the CIR.

At block 418, method 400 may then include providing the filtered audio signal to an automatic speech recognition system, which may perform additional filtering to remove background noise and/or determine whether the audio signal includes one or more commands that should be carried out. Method 400 may then end at block 420.

In some examples, method 400 may further include a step of determining that the first and/or second vehicle seats have changed a position, and responsively determining an updated CIR based on the changed seat position. Other variations are possible as well.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:

a microphone;

an adjustable seat comprising sensors;

memory to store a plurality of cabin impulse responses (CIR);

a processor configured to:

determine, via the sensors, a first adjustment of the adjustable seat when an audio signal is received by the microphone;

select one of plurality of CIRs based on the first adjustment of the adjustable seat; and filter the received audio signal based on the selected CIR.

2. The vehicle of claim 1, wherein each of the plurality of CIRs corresponds to an adjustment of the adjustable seat.

3. The vehicle of claim 1, wherein the plurality of CIRs are predetermined.

4. The vehicle of claim 1, comprising:

a cabin floor, the adjustable seat mounted on the cabin floor, wherein the adjustable seat comprises: a base; and a back support connected to the base, and wherein the adjustable seat is adjustable to a plurality of adjustments, each of the plurality of adjustments defined in terms of (i) a horizontal position of the adjustable seat relative to the cabin floor, (ii) a vertical position of the adjustable seat relative to the cabin floor, and (iii) a rotational position of the back support relative to the base.

5. The vehicle of claim 1, wherein the adjustable seat is a first adjustable seat and the sensors are first sensors, wherein the vehicle further comprises a second adjustable seat comprising second sensors, wherein the processor is further configured to:

determine, via the second sensors, a first adjustment of the second adjustable seat when the audio signal is received; and select one of the plurality of CIRs based on the first adjustment of the first adjustable seat and the first adjustment of the second adjustable seat.

6. The vehicle of claim 1, wherein each of the plurality of CIRs comprises a transfer function between a position proximate a head of an occupant of the adjustable seat and the microphone.

7. The vehicle of claim 6, wherein the transfer function corresponds to a geometry of an interior of the vehicle.

8. The vehicle of claim 1, wherein the processor is further configured to filter the received audio signal by performing a deconvolution operation on the received audio signal with the selected CIR.

9. The vehicle of claim 1, comprising an input device, wherein the processor is further configured to receive, via the input device, an occupant height corresponding to the adjustable seat, and wherein the processor is further configured to select one of the plurality of CIRs based on the first adjustment of the adjustable seat and the occupant height.

10. A method comprising receiving, by a microphone of a vehicle, an audio signal;

responsive to receiving the audio signal by the microphone, determining, by a processor and sensors, a first adjustment of an adjustable seat in the vehicle;

selecting, by the processor, one of a plurality of cabin impulse responses (CIR) stored in a memory based on the first adjustment of the adjustable seat; and filtering, by the processor, the received audio signal based on the selected CIR.

11. The method of claim 10, wherein the adjustable seat is adjustable to a plurality of adjustments, and wherein each of the plurality of CIRs corresponds to each of the plurality of adjustments.

12. The method of claim 10, wherein the plurality of CIRs are predetermined.

13. The method of claim 11, wherein each of the plurality of adjustments are defined in terms of (i) a horizontal position of the adjustable seat relative to a cabin floor of the vehicle, (ii) a vertical position of the adjustable seat relative to the cabin floor, and (iii) a rotational position of a back support of the adjustable seat relative to a base of the adjustable seat.

14. The method of claim 10, wherein the adjustable seat is a first adjustable seat and the sensors are first sensors, the method further comprising:

determining, via second sensors, a first adjustment of a second adjustable seat in the vehicle when the audio signal is received;

selecting one of the plurality of CIRs based on the first adjustment of the first adjustment of the first adjustable seat and the first adjustment of the second adjustable seat.

15. The method of claim 10, wherein each of the plurality of CIRs comprises a transfer function between a position proximate a head of an occupant of the adjustable seat and the microphone.

16. The method of claim 15, wherein the transfer function corresponds to a geometry of an interior of the vehicle.

17. The method of claim 10, further comprising filtering the received audio signal by performing a deconvolution operation on the received audio signal with the selected CIR.

18. The method of claim 10, further comprising:

receiving, via an input device, an occupant height corresponding to the adjustable seat; and selecting one of the plurality of CIRs based on the first adjustment of the adjustable seat and the occupant height.

* * * * *